United States Patent
Holness et al.

(10) Patent No.: US 9,893,937 B2
(45) Date of Patent: Feb. 13, 2018

(54) NETWORK TECHNOLOGY INTERWORKING VIA USER PROGRAMMABLE EVENT-ACTION PROFILES

(71) Applicant: Ciena Corporation, Hanover, MD (US)

(72) Inventors: Marc Holness, Ottawa (CA);
Wei-Chiuan Chen, San Jose, CA (US);
Asheesh Jadav, Santa Clara, CA (US)

(73) Assignee: Ciena Corporation, Hanover, MD (US)

( * ) Notice: Subject to any disclaimer, the term of this patent is extended or adjusted under 35 U.S.C. 154(b) by 785 days.

(21) Appl. No.: 13/864,781

(22) Filed: Apr. 17, 2013

(65) Prior Publication Data
US 2014/0317248 A1    Oct. 23, 2014

(51) Int. Cl.
*H04L 12/24* (2006.01)

(52) U.S. Cl.
CPC .......... *H04L 41/0816* (2013.01); *H04L 41/06* (2013.01)

(58) Field of Classification Search
None
See application file for complete search history.

(56) References Cited

U.S. PATENT DOCUMENTS

| | | | | |
|---|---|---|---|---|
| 6,965,917 B1 * | 11/2005 | Aloni | ................... | G06Q 10/107 709/205 |
| 2006/0227797 A1 * | 10/2006 | Chandika | ................ | H04L 41/08 370/419 |
| 2006/0230443 A1 * | 10/2006 | Yim | .................... | H04L 63/0209 726/12 |
| 2013/0194932 A1 * | 8/2013 | Bencheck | .............. | H04L 41/18 370/241.1 |

* cited by examiner

*Primary Examiner* — Angela Nguyen
(74) *Attorney, Agent, or Firm* — Clements Bernard Walker PLLC; Christopher L. Bernard; Lawrence A. Baratta, Jr.

(57) ABSTRACT

The disclosure is directed to configuring an internetworking of a first network and a second network. Data representing one or more network events is received at a network element, data representing one or more actions to be performed by the second network in response to detection of the one or more events on the first network is received at the network element, and a mapping of the one or more network events to the one or more actions is stored by the network element.

42 Claims, 11 Drawing Sheets

NETWORK TECHNOLOGY INTERWORKING VIA USER PROGRAMMABLE EVENT-ACTION PROFILES

BACKGROUND OF THE INVENTION

1. Field of the Invention

The disclosure is directed to network technology interworking via user programmable event-action profiles.

2. Description of the Related Art

Data communication networks may include various computers, servers, nodes, routers, switches, bridges, hubs, proxies, and other network devices coupled to and configured to pass data to one another. These devices will be referred to herein as "network elements." Data is communicated through the data communication network by passing protocol data units, such as Internet Protocol packets, Ethernet Frames, data cells, segments, or other logical associations of bits/bytes of data, between the network elements by utilizing one or more communication links between the network elements. A particular protocol data unit may be handled by multiple network elements and cross multiple communication links as it travels between its source and its destination over the network.

The various network elements on the communication network communicate with each other using predefined sets of rules, referred to herein as protocols. Different protocols are used to govern different aspects of the communication, such as how signals should be formed for transmission between network elements, various aspects of what the protocol data units should look like, how protocol data units should be handled or routed through the network by the network elements, and how information such as routing information should be exchanged between the network elements. Ethernet is one such well known networking protocol that has been defined by the Institute of Electrical and Electronics Engineers (IEEE) as standards 802.1 and 802.3.

In general, data networks are becoming exceedingly complex to manage with a prime contributor being the implementation of an ever increasing number of distributed protocols and the use of closed and proprietary interfaces within them. In this environment, it is very difficult (if not impossible), for network operators to customize and optimize networks and network interconnections (i.e., technology interworking) for their use cases including the application set that is relevant to their business.

In general, carrier Ethernet technology interworking needs to occur (at a minimum) on three dimensions: the data plane, the operations, administration, and management (OAM) plane, and the control plane. Data plane interworking is typically straightforward and follows configuration rules. OAM/control plane interworking, however, is far more complex and provides an implementation and architectural challenge to many carrier Ethernet platforms.

Accordingly, it would be beneficial to provide a mechanism whereby a user/operator, via an external interface (i.e. a centralized vantage point), can specify OAM/control plane interactions in support of carrier Ethernet or packet network technology interworking

SUMMARY

The disclosure is directed to configuring an internetworking of a first network and a second network. A method of configuring an internetworking of a first network and a second network includes receiving, at a network element, data representing one or more network events, receiving, at the network element, data representing one or more actions to be performed by the second network in response to detection of the one or more events on the first network, and storing, by the network element, a mapping of the one or more network events to the one or more actions.

An apparatus for configuring an internetworking of a first network and a second network includes logic configured to receive, at a network element, data representing one or more network events, logic configured to receive, at the network element, data representing one or more actions to be performed by the second network in response to detection of the one or more events on the first network, and logic configured to store, by the network element, a mapping of the one or more network events to the one or more actions.

An apparatus for configuring an internetworking of a first network and a second network includes means for receiving, at a network element, data representing one or more network events, means for receiving, at the network element, data representing one or more actions to be performed by the second network in response to detection of the one or more events on the first network, and means for storing, by the network element, a mapping of the one or more network events to the one or more actions.

A non-transitory computer-readable medium for configuring an internetworking of a first network and a second network includes at least one instruction to receive, at a network element, data representing one or more network events, at least one instruction to receive, at the network element, data representing one or more actions to be performed by the second network in response to detection of the one or more events on the first network, and at least one instruction to store, by the network element, a mapping of the one or more network events to the one or more actions.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Figure 1:
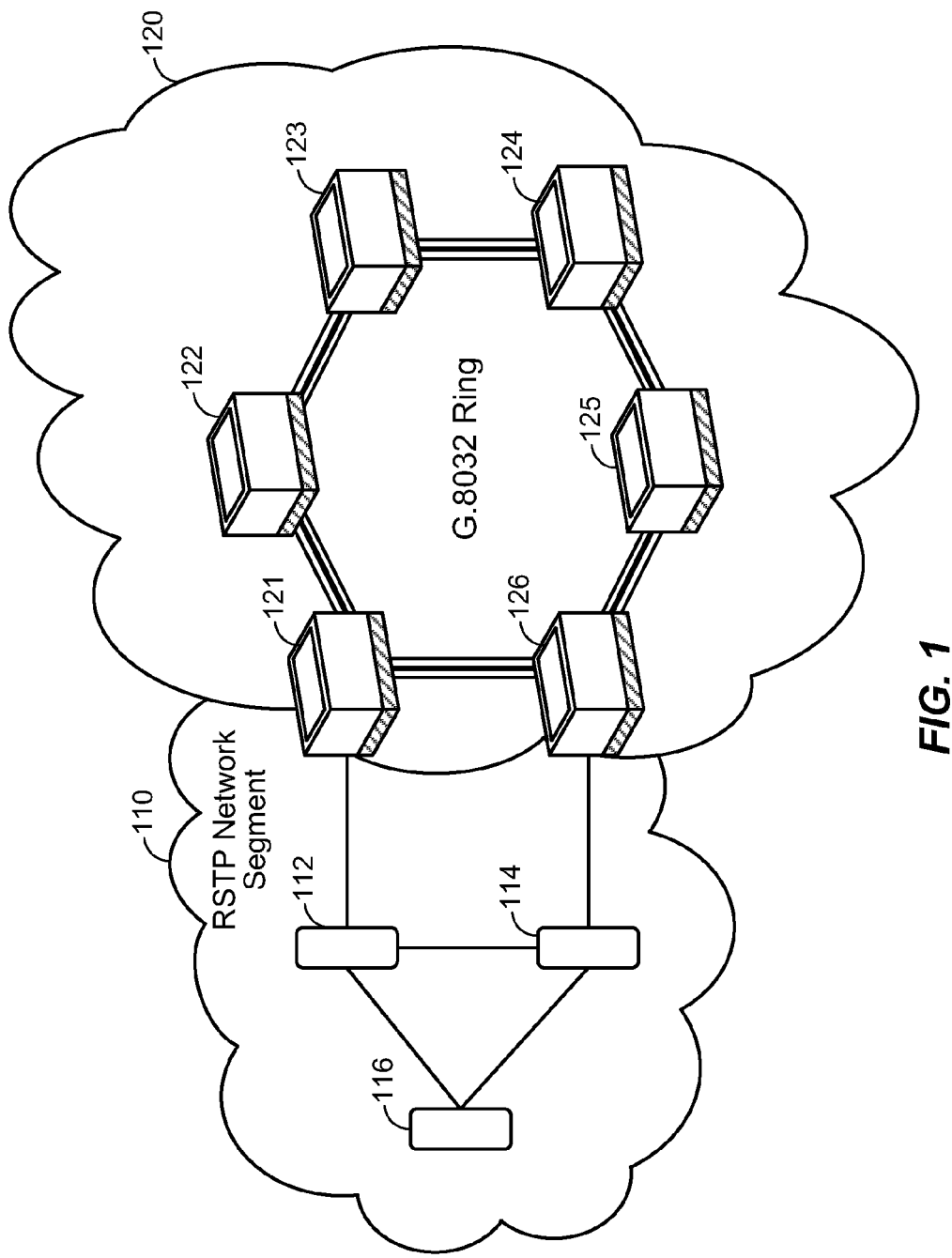
FIG. 1 illustrates a high-level system architecture of a communications system in which a first network segment and a second network segment are interconnected.

Various aspects are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Data communication networks may include various computers, servers, nodes, routers, switches, bridges, hubs, proxies, and other network devices coupled to and configured to pass data to one another. These devices will be referred to herein as "network elements." Data is communicated through the data communication network by passing protocol data units, such as Internet Protocol packets, Ethernet Frames, data cells, segments, or other logical associations of bits/bytes of data, between the network elements by utilizing one or more communication links between the network elements. A particular protocol data unit may be handled by multiple network elements and cross multiple communication links as it travels between its source and its destination over the network.

The various network elements on the communication network communicate with each other using predefined sets of rules, referred to herein as protocols. Different protocols are used to govern different aspects of the communication, such as how signals should be formed for transmission between network elements, various aspects of what the protocol data units should look like, how protocol data units should be handled or routed through the network by the network elements, and how information such as routing information should be exchanged between the network elements. Ethernet is one such well known networking protocol that has been defined by the Institute of Electrical and Electronics Engineers (IEEE) as standards 802.1 and 802.3.

FIG. 1 illustrates a high-level system architecture of a communications system in which a first network segment 110 and a second network segment 120 are interconnected. In the example of FIG. 1, the first network segment 110 is a Rapid Spanning Tree Protocol (RSTP) network segment and the second network segment 120 is a G.8032 ring. The RSTP network segment 110 comprises network elements 112, 114, and 116. The network elements 112, 114, and 116 may be computers, servers, nodes, routers, switches, bridges, hubs, proxies, and/or other network devices configured to pass data to one another. The G.8032 ring 120 comprises network elements 121, 122, 123, 124, 125, and 126. The network elements 121, 122, 123, 124, 125, and 126 may be computers, servers, nodes, routers, switches, bridges, hubs, proxies, and/or other network devices configured to pass data to one another. The interconnections between network segments 110 and 120 and the network elements 112, 114, 116, 121, 122, 123, 124, 125, and 126 may be wired and/or wireless.

RSTP network segment 110 and the G.8032 ring 120 communicate with, or transmit data to, each other over the connection between network element 112 and network element 121, and over the connection between network element 114 and network element 126.

Figure 2:
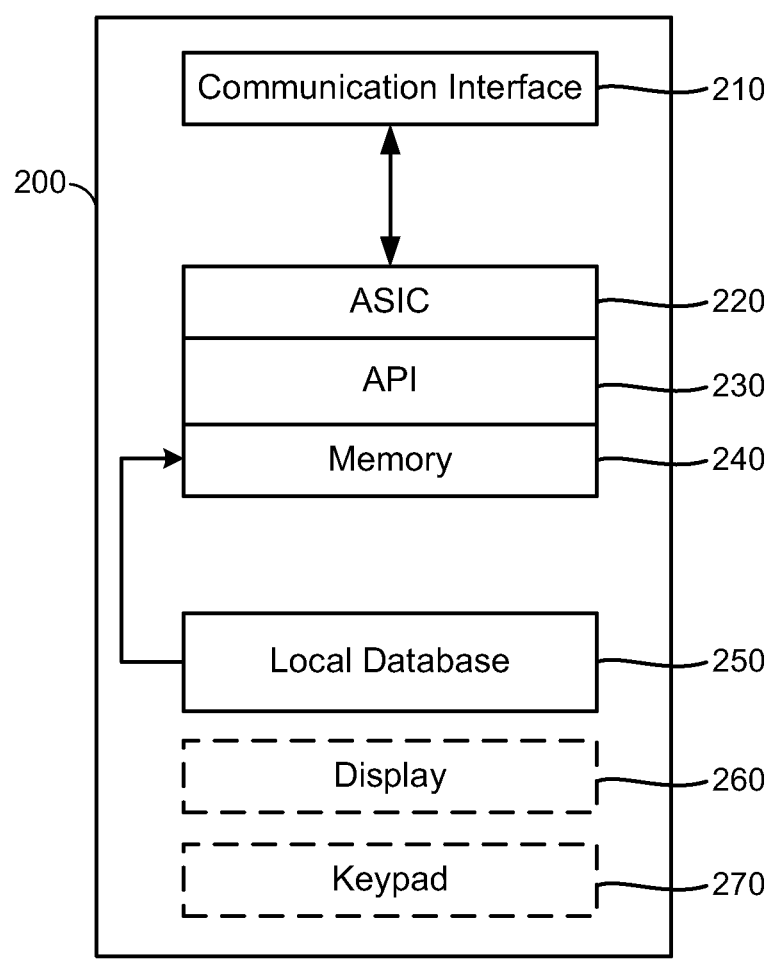
FIG. 2 illustrates an exemplary network element 200 according to at least one aspect.

FIG. 2 illustrates an exemplary network element 200 according to at least one aspect. The network element may be a desktop computer, a server, a node, a router, a switch, a bridge, a hub, a proxy, or any other network device coupled to and configured to pass data to one or more other network devices. In an example, the network element 200 may correspond to any of network elements 112, 114, 116, 121, 122, 123, 124, 125, or 126.

While the internal components of the network element 200 can be embodied with different hardware configurations, an exemplary high-level configuration for various internal hardware components is shown in FIG. 2. The network element 200 can receive and execute software applications, data and/or commands received from a user, another network element, a remote server, etc. The network element 200 can also independently execute locally stored applications. The network element can include a communication interface 210 operably coupled to an application specific integrated circuit (ASIC) 220, or other processor, microprocessor, logic circuit, or other data processing device. The ASIC 220 or other processor executes the application programming interface (API) 230 layer that interfaces with any resident programs in the memory 240 of the network element 200. The memory 240 can be comprised of read-only memory (ROM) or random-access memory (RAM), electrically erasable programmable ROM (EEPROM), flash cards, or any memory common to computer platforms. The network element 200 also can include a local database 250 that can store applications not actively used in memory 240, as well as other data. The local database 250 is typically a flash memory cell, but can be any secondary storage device as known in the art, such as magnetic media, EEPROM, optical media, tape, soft or hard disk, or the like.

Communication interface 210 may be any communication interface operable to receive and transmit data. For example, the communication interface 210 may be a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). The communication interface 210 may alternatively, or additionally, be a wired communications interface (e.g., a serial connection, a USB or Firewire connection, an Ethernet connection, etc.) and associated hardware. The communication interface 210 may alternatively, or additionally, be a user interface configured to receive input from a user. Accordingly, the communication interface 210 may be a wireless communication interface, a wired communication interface, and/or a user interface.

The network element 200 optionally includes a display 260 and a keypad 270. A user may use the display 260 and the keypad 270 to provide input to or receive output from the network element 200.

Accordingly, an aspect of the disclosure can include a network element, such as network element 200, including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 220, memory 240, API 230, and local database 250 may all be used cooperatively to load, store and execute the various functions disclosed herein and thus the logic to perform these functions may be distributed over various elements. Alternatively, the functionality could be incorporated into one discrete component. Therefore, the features of the network element 200 are to be considered merely illustrative and the disclosure is not limited to the illustrated features or arrangement.

Figure 3:
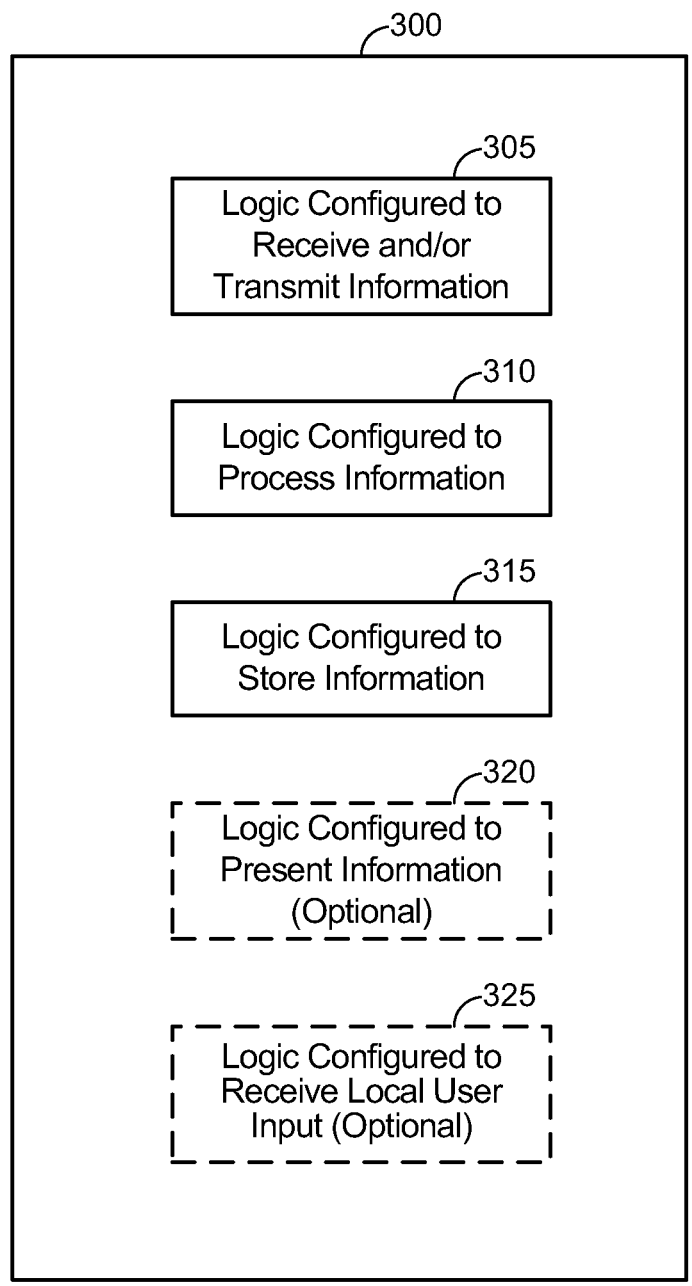
FIG. 3 illustrates a communication device that includes logic configured to perform functionality in accordance with an aspect of the disclosure.

FIG. 3 illustrates a communication device 300 that includes logic configured to perform functionality. The communication device 300 can correspond to any of the above-noted communication devices, including but not limited to network element 200, any component of the RSTP network segment 110, any component of the G.8032 ring 120, and so on. Thus, communication device 300 can correspond to any electronic device that is configured to communicate with (or facilitate communication with) one or more other entities over a packet network.

Referring to FIG. 3, the communication device 300 includes logic configured to receive and/or transmit information 305. In an example, if the communication device 300 corresponds to a wireless communications device, the logic configured to receive and/or transmit information 305 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 305 can correspond to a wired communications interface (e.g., a serial connection, a USB or Firewire connection, an Ethernet connection, etc.). Thus, if the communication device 300 corresponds to some type of network element, such as network element 200, the logic configured to receive and/or transmit information 305 can correspond to an Ethernet card, in an example, that connects the network element to other communication entities via an Ethernet protocol. The logic configured to receive and/or transmit information 305 may include logic configured to receive, at a network element, data representing one or more network events. The logic configured to receive and/or transmit information 305 may also include logic configured to receive, at a network element, data representing one or more actions to be performed by the second network in response to detection of the one or more events on the first network. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the processor included in the logic configured to process information 310 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM, flash memory, ROM, erasable programmable ROM (EPROM), EEPROM, registers, hard disk, a removable disk, a CD-ROM, or any other form of storage medium known in the art. The logic configured to store information 315 may include logic configured to store, by a network element, a mapping of the one or more network events to the one or more actions. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to the network element 200 as shown in FIG. 2, the logic configured to present information 320 can include the display 260 of network element 200. In a further example, the logic configured to present information 320 can be omitted for certain communication devices, such as network communication devices that do not have a local user (e.g., network switches or routers, remote servers, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to the network element 200 as shown in FIG. 2, the logic configured to receive local user input 325 can include the keypad 270. In a further example, the logic configured to receive local user input 325 can be omitted for certain communication devices, such as network communication devices that do not have a local user (e.g., network switches or routers, remote servers, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

In general, data networks are becoming exceedingly complex to manage with a prime contributor being the implementation of an ever increasing number of distributed protocols and the use of closed and proprietary interfaces within them. In this environment, it is very difficult (if not impossible), for network operators to customize and optimize networks and network interconnections (i.e., technology interworking) for their use cases including the application set that is relevant to their business.

Software defined networking (SDN) is an approach to building computer networks that separates and abstracts elements of these systems. SDN allows system administrators to quickly provision network connections on the fly instead of manually configuring policies and to have programmable central control of network traffic without requiring physical access to the network's hardware devices. These elements are called the "control plane" and the "data plane." SDN decouples the system that makes decisions about where traffic is sent (the control plane) from the underlying system that forwards traffic to the selected destination (the data plane).

In general, packet network (e.g., Carrier Ethernet) technology interworking needs to occur (at a minimum) on three dimensions: the data plane, the operations, administration, and management (OAM) plane, and the control plane. Data plane interworking is typically straightforward and follows configuration rules. OAM/control plane interworking, however, is far more complex and provides an implementation and architectural challenge to many packet network platforms.

Currently, network elements (e.g., Carrier Ethernet devices) that provide technology interworking control plane functionality internally imbed the control plane inter-relationships. They do not provide a mechanism to allow the user to change these relationships. This lack of customization (via an external access point/interface) of the control plane inter-relationships causes a number of issues:
1) Does NOT allow the operator or a third party to create new network management and control applications.
2) Does NOT allow a network operator to mix and match devices from different vendors and make independent choices for the control and data plane vendors, in support of technology interworking
3) Does NOT allow a network operator to use different and customized control plane solutions for different virtual networks and thus not become dependent on a single vendor.
4) Does NOT make it possible for researchers to experiment with their research ideas on a slice of a production network providing technology interworking without impacting it, offering researchers a much larger realistic infrastructure than has been possible before.

The disclosure is directed to an SDN solution that defines device interfaces in support of programmable event-action profiles that support packet networking technology interworking. The various aspects of the disclosure provide external access (e.g. via a portal or interface) to the OAM/control plane interworking relationships to support packet network technology interworking and allow control plane interactions to be "programmed" by the user. The various aspects also separate the data and control planes to support packet network technology interworking A network operator can explicitly define and control the network element control plane interactions to support the technology interworking demands within the network.

This provides a number of benefits. For example, the network operator, or a third party, can create new network management and control applications, mix and match devices from different vendors and make independent choices for the control and data plane vendors, and use different and customized control plane solutions for different virtual networks, and thus not become dependent on a single vendor. As another example, researchers can experiment with their research ideas on a slice of a production network providing technology interworking without impacting it, offering researchers a much larger realistic infrastructure than is typically available.

An interface provides a programmable mechanism that allows the user to specify how network elements should interact between technology domains. The user can specify a small set of events and corresponding actions that a network element needs to support. An "event-action" profile defines the relationships between the configured events and corresponding actions. This allows the user to combine any combination of events and actions to support customized control plane interactions in support of technology interworking.

An "event-action" profile is a (user) programmable table that associates the detection of an event with an action to be performed. An entry in the "event-action" profile may comprise one or more events and one or more corresponding actions. An interface identifier is associated with each specified event, and another interface identifier is associated with each specified action. When multiple events are specified, the configured action(s) can be triggered based upon a single event being detected, or all events being detected.

Table 1 illustrates an exemplary event-action profile for different exemplary packet network technologies. A user can configure such an event-action profile via the user interface of a network element.

TABLE 1

| Technology Interworking Description | Event | Receiver Interface | Action | Transmitter Interface |
|---|---|---|---|---|
| RSTP to G.8032 | RSTP TCN | Port {4} | G.8032 Flush | G.8032 Ring Instance |
| PBB-TE to MPLS/MPLS-TP | EVC State Change EVC State Change | PBB-TE Tunnel {V} MPLS Tunnel {U} | Flush FDB | Port {3} |
| xSTP to PBB-TE | EVC Down EVC Up Port Up Port Down | PBB-TE Tunnel {W} Port {2} | Port Down Port Up EVC Up EVC Down | Port {2} PBB-TE Tunnel {W} |
| G.8032 to PBB-TE | G.8032 R-APS Status Change EVC State Change | G.8032 VR Y PBB-TE Tunnel {X} | Flush FDB | Port {20, 21} |
| G.8032 to G.8032 | G.8032 R-APS Status Change | G.8032 VR X | G.8032 Flush | G.8032 Ring Instance |
| G.8032 to MPLS/MPLS-TP | EVC State Change G.8032 R-APS Status Change | MPLS Tunnel {Z} G.8032 VR Z | Flush FDB | Port {10, 11} |

In Table 1, RSTP means Rapid Spanning Tree Protocol, PBB-TE means Provider Backbone Bridge Traffic Engineering, MPLS/MPLS-TP means Multiprotocol Label Switching/Multiprotocol Label Switching Transport Profile, and xSTP means any Spanning Tree Protocol. Further, TCN means Topology Change Notification, EVC means Ethernet Virtual Connection/Circuit, FDB means Filtering Database, and R-APS means Ring Automatic Protection Switching.

In constructing an event-action profile, the user can identify the desired interworking scenarios and map the events and actions required to support those interworking scenarios to each other. For example, given the following interworking scenarios:
1) xSTP ↔ G.8032
2) G.8032 ↔ PBB-TE
3) G.8032 ↔ MPLS/MPLS-TP
4) G.8032 ↔ G.8032
5) xSTP ↔ PBB-TE
6) PBB-TE ↔ MPLS/MPLS-TP There are three events and three actions required to support these internetworking scenarios. The events are:
1) xSTP TCN: Identify the receiver of an xSTP TCN protocol data unit (PDU) on a configured port.
2) G.8032 R-APS Status Change.
3) EVC State Change (where EVC could be a PBB-TE or MPLS/MPLS-TP tunnel, etc.).

The actions are:
1) G.8032 Flush: Transmit G.8032 R-APS (with flush event) to configured virtual ring ports.
2) FDB Flush: Remove FDB entries associated with configured port(s).
3) Port Up/Down.

The user, via the user interface, specifies the event designation and the association to the device interface (i.e., port or sub-port) where event detection is to occur. Likewise, the user specifies the action designation and the interface (i.e., port or sub-port) to be taken based upon the detection of a configured event.

The configured events should correspond to specific actions for the internetworking to perform properly. However, a user can experiment with the network by entering different action(s) instead.

Event-action profiles can be stored on the network elements providing the interconnection. Each of these network elements does not need to be individually programmed, however. A remote controller/server could transmit the event-action profiles to the internetworking network elements. In the example of FIG. 1, network elements 112, 114, 121, and 126 are the internetworking network elements and would store event-action profiles.

Referring to the example illustrated in FIG. 1, an entry in the event-action profiles stored at network elements 121 and 126 might include the entry illustrated in Table 2.

TABLE 2

Device 121/126 Event-Action Profile

| Entry | Event | Interface | Action | Interface |
| --- | --- | --- | --- | --- |
| 1 | xSTP TCN | <112-121>/<br><114-126> | G.8032 Flush Event | G.8032 VR <ID> |

The Interface field corresponding to the xSTP event indicates the interface between the xSTP device and the G.8032 device, here the interface between network element 112 and network element 121 and the interface between network element 114 and network element 126. Note that the G.8032 Flush Event is a standardized R-APS PDU that causes all ring nodes to flush their FDB.

Figure 4A:
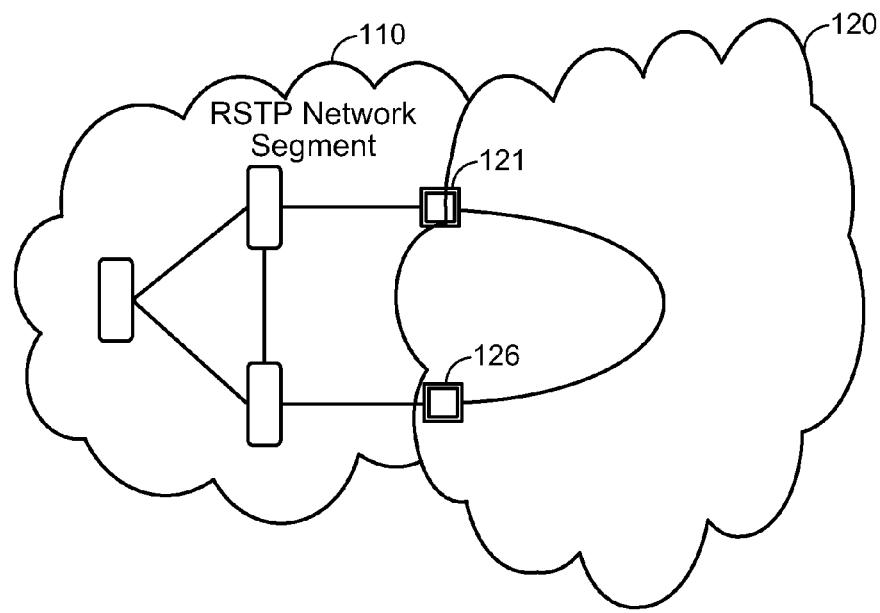
FIG. 4A illustrates a logical network view from the perspective of the RSTP network segment illustrated in FIG. 1.

FIG. 4A illustrates a logical network view from the perspective of the RSTP network segment 110 illustrated in FIG. 1. From the viewpoint of the RSTP network segment 110, the G.8032 ring 120 provides transparent tunneling of RSTP PDUs over the G.8032 ring 120 via network elements 121 and 126 using the Layer 2 control frame tunnel (L2CFT) feature.

Figure 4B:
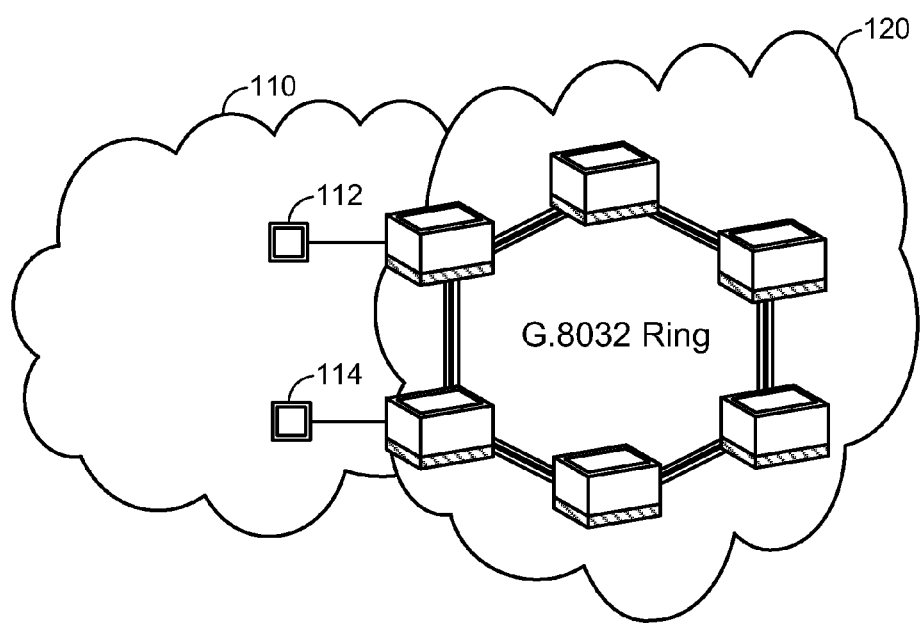
FIG. 4B illustrates a logical network view from the perspective of the G.8032 ring illustrated in FIG. 1.

FIG. 4B illustrates a logical network view from the perspective of the G.8032 ring 120 illustrated in FIG. 1. From the viewpoint of the G.8032 ring 120, the RSTP network segment 110 provides multiple User Network Interface (UNI) access points to the G.8032 ring 120 via network elements 112 and 114.

Figure 4C:
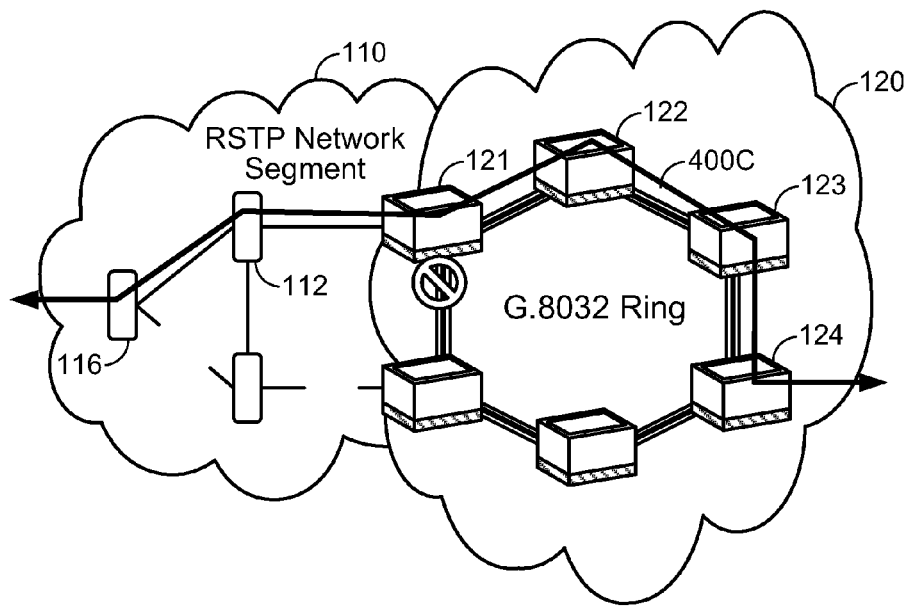
FIG. 4C illustrates a normal scenario, in which an end-to-end service traffic flow is supported.

FIGS. 4C to 4H illustrate various exemplary internetworking scenarios in the RSTP network segment 110 and the G.8032 ring 120 illustrated in FIG. 1. FIG. 4C illustrates normal scenario, in which end-to-end service traffic flow is supported. A data flow 400C is provided along a path of network elements comprising network elements 116, 112, 121, 122, 123, and 124.

Figure 4D:
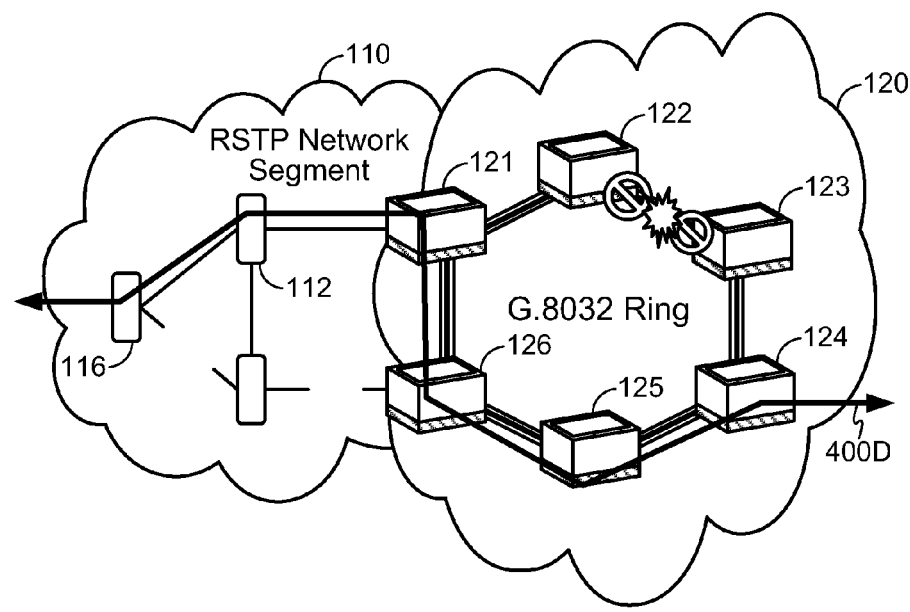
FIG. 4D illustrates a G.8032 fault in a G.8032 ring between two network elements and resolved by the G.8032 protocol.

FIG. 4D illustrates a G.8032 fault in the G.8032 ring 120 between network elements 122 and 123 resolved by the G.8032 protocol. Full connectivity between the RSTP network segment 110 and the G.8032 ring 120 is maintained while providing deterministic resiliency. A data flow 400D is provided along a path of network elements comprising network elements 116, 112, 121, 126, 125, and 124.

Figure 4E:
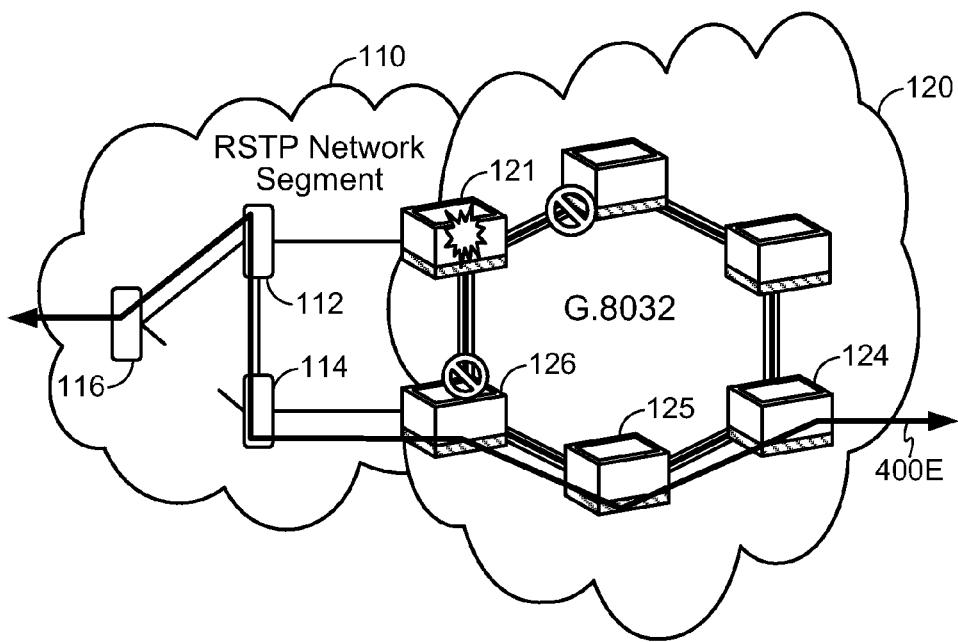
FIG. 4E illustrates a G.8032 nodal fault at a network element.

FIG. 4E illustrates a G.8032 nodal fault at network element 121. The fault in G.8032 ring 120 is resolved by the G.8032 protocol. The fault in network element 121 causes a change to the RSTP topology, and causes the RSTP protocol to create a new spanning tree. Full connectivity between the RSTP network segment 110 and the G.8032 ring 120 is maintained while providing deterministic resiliency. A data flow 400E is provided along a path of network elements comprising network elements 116, 112, 114, 126, 125, and 124.

Figure 4F:
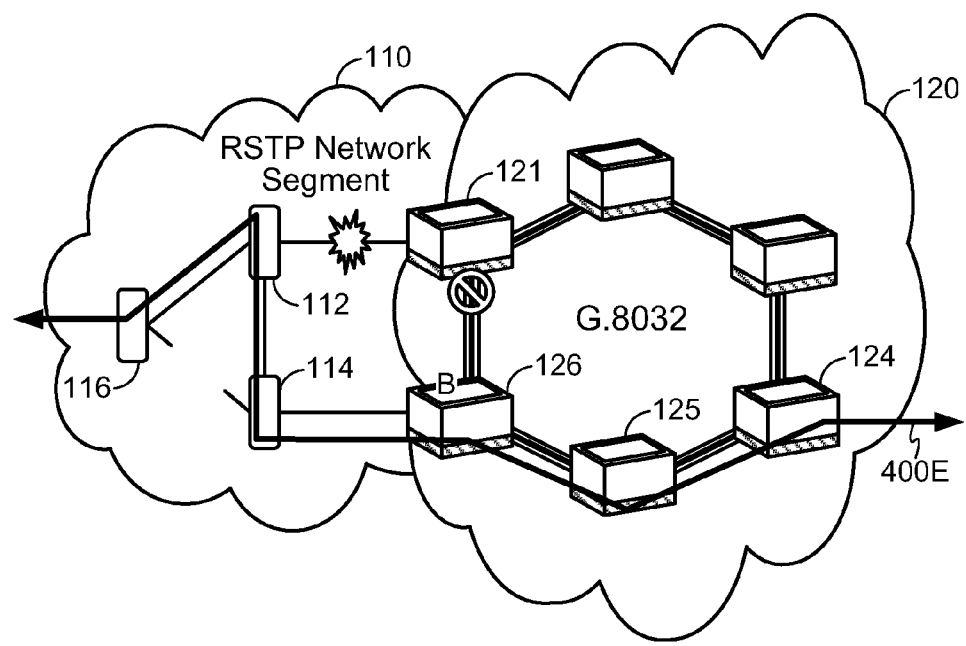
FIG. 4F illustrates a fault in an RSTP network segment.

FIG. 4F illustrates a fault in the RSTP network segment 110. The fault causes the RSTP topology to change, and may result in the formation of a new spanning tree. A potential result in the new spanning tree formation is that service traffic may use network element 126, instead of network element 121, to access the G.8032 ring 120. Event-action profile programming causes TCN event detection at network elements 121 and/or 126 to perform the action of a G.8032 flush, which cause re-convergence within the G.8032 ring 120 domain. Full connectivity between the RSTP network segment 110 and the G.8032 ring 120 is maintained while providing deterministic resiliency. A data flow 400F is provided along a path of network elements comprising network elements 116, 112, 114, 126, 125, and 124.

Figure 4G:
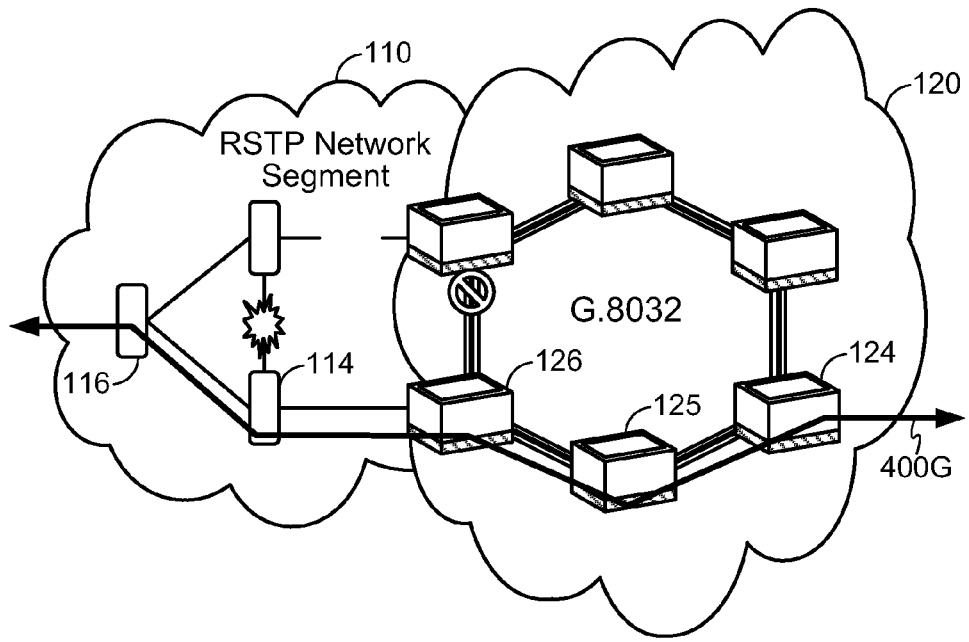
FIG. 4G illustrates a fault in an RSTP network segment.

FIG. 4G illustrates a fault in the RSTP network segment 110. The fault causes the RSTP topology to change, and may result in the formation of a new spanning tree. The potential result in the new spanning tree formation is that the service traffic uses network element 126, instead of network element 121, to access the G.8032 ring 120. Event-action profile programming causes TCN event detection at network elements 121 and/or 126 to perform the action of a G.8032 flush, which causes re-convergence within the G.8032 ring 120 domain. Full connectivity between the RSTP network segment 110 and the G.8032 ring 120 is maintained while providing deterministic resiliency. A data flow 400G is provided along a path of network elements comprising network elements 116, 114, 126, 125, and 124.

Figure 4H:
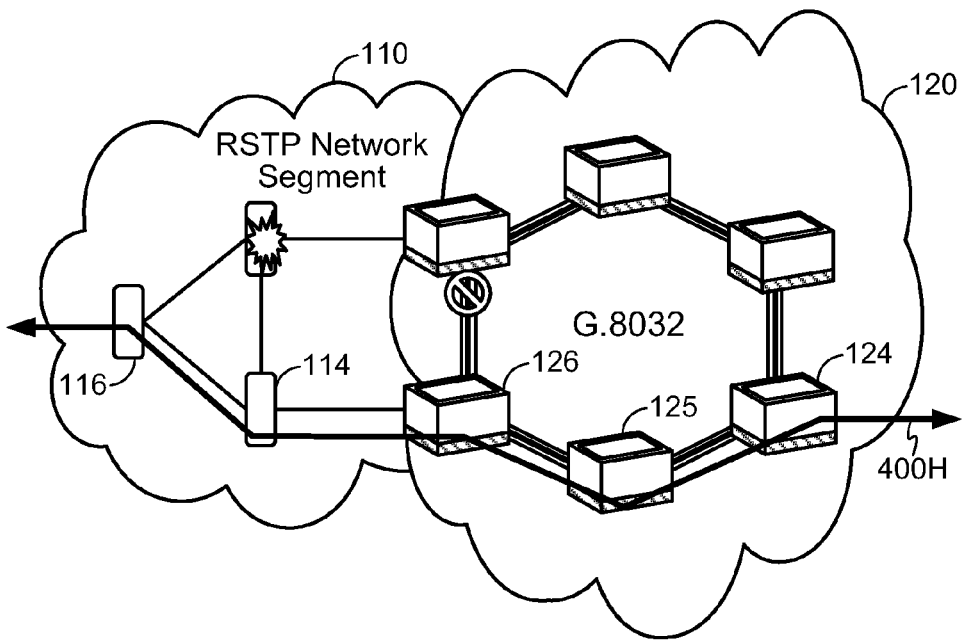
FIG. 4H illustrates an RSTP network segment fault at a network element.

FIG. 4H illustrates an RSTP network segment 110 fault at network element 112. The fault in the RSTP network segment 110 causes the RSTP topology to change, and may result in the formation of a new spanning tree. The potential result in the new spanning tree formation is that the service traffic uses network element 126, instead of network element 121, to access the G.8032 ring 120. Event-action profile programming causes TCN event detection at network elements 121 and/or 126 to perform the action of a G.8032 flush, which cause re-convergence within the G.8032 ring 120 domain. Full connectivity between the RSTP network segment 110 and G.8032 ring 120 is maintained while providing deterministic resiliency. A data flow 400H is provided along a path of network elements comprising network elements 116, 114, 126, 125, and 124.

Figure 5:
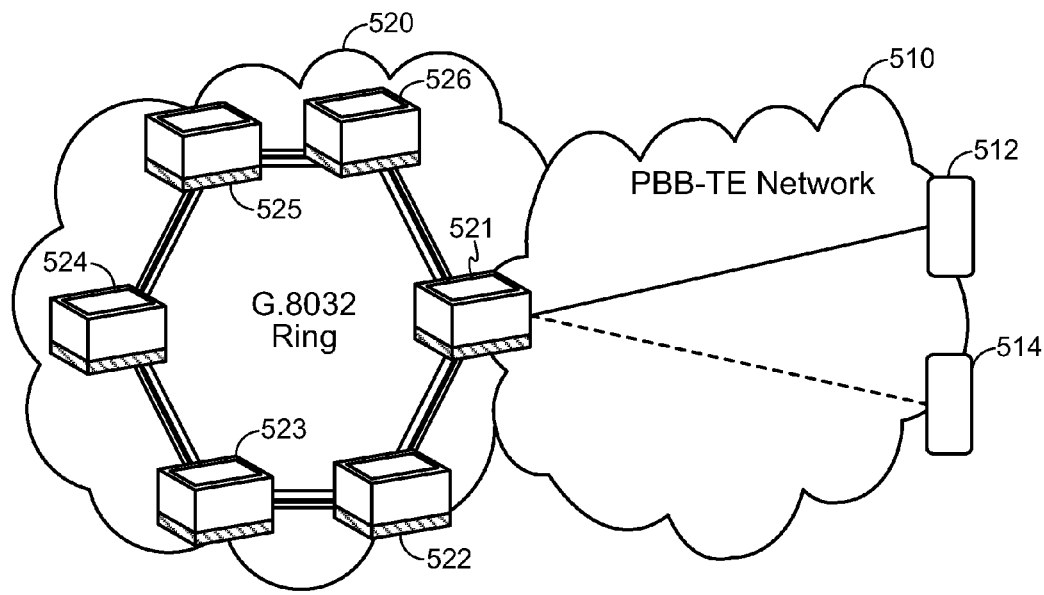
FIG. 5 illustrates a high-level system architecture of an exemplary communications system in which a first network and a second network are interconnected.

FIGS. 5 to 10 illustrate various exemplary internetworking scenarios. FIG. 5 illustrates a high-level system architecture of an exemplary communications system in which a first network 510 and a second network 520 are interconnected. In the example of FIG. 5, the first network 510 is a PBB-TE network and the second network 520 is a G.8032 ring. The PBB-TE network 510 comprises network elements 512 and 514. The network elements 512 and 514 may be computers, servers, nodes, routers, switches, bridges, hubs, proxies, and/or other network devices configured to pass data to one another. The G.8032 ring 520 comprises network elements 521, 522, 523, 524, 525, and 526. The network elements 521, 522, 523, 524, 525, and 526 may be computers, servers, nodes, routers, switches, bridges, hubs, proxies, and/or other network devices configured to pass data to one another. In FIG. 5, the solid line between network elements 521 and 512 indicates the primary data path, while the dashed line between network elements 521 and 514 indicates a backup data path.

Network elements 522, 523, 524, 525, and 526 are configured with the G.8032 protocol. The network element 521 is not configured as a G.8032 node, but is configured to transmit R-APS PDUs to network elements 522 and 526. The network element 521 can terminate the PBB-TE tunnel protection group (working and protected). A Continuity Check Message (CCM) session can optionally be configured between network elements 521 and 526, and network elements 521 and 522.

Referring to the example illustrated in FIG. 5, an entry in the event-action profiles stored at network element 521 might include the entries illustrated in Table 3.

TABLE 3

Network Element 521 Event-Action Profile

| Entry | Event | Interface | Action | Interface |
|---|---|---|---|---|
| 1 | G.8032 R-APS Status Change | <521-526> | Flush FDB | <521-526, 521-522> |
| 2 | PBB-TE Tunnel State Change | | Flush FDB | <521-526, 521-522> |

The Interface value "<521-526>" indicates the interface between network elements 521 and 526. The Interface value "<521-526, 521-522>" indicates the interfaces between network elements 521 and 526 and 521 and 522.

Figure 6:
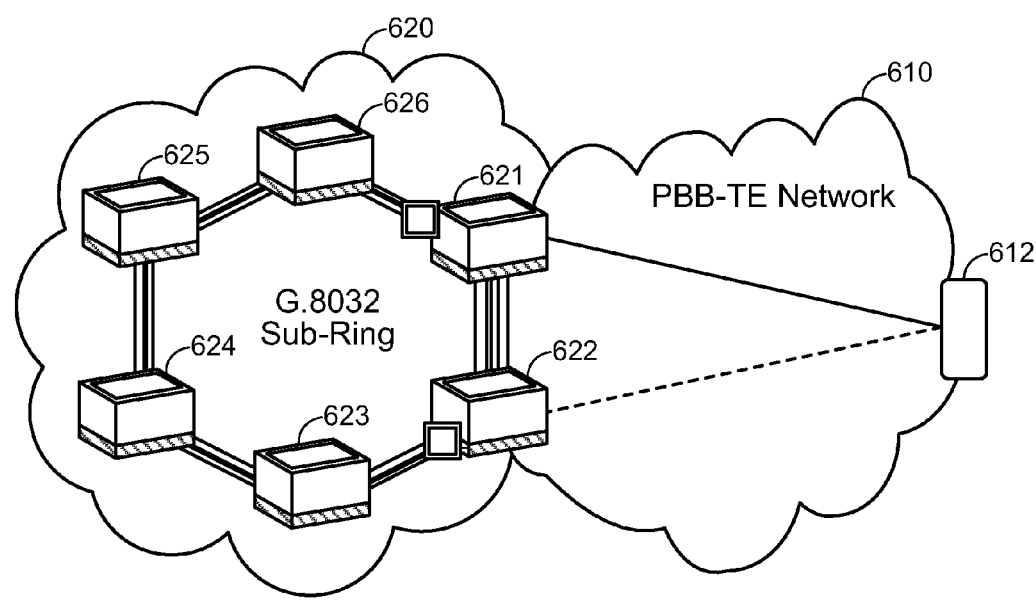
FIG. 6 illustrates a high-level system architecture of an exemplary communications system in which a first network and a second network are interconnected.

FIG. 6 illustrates a high-level system architecture of an exemplary communications system in which a first network 610 and a second network 620 are interconnected. In the example of FIG. 6, the first network 610 is a PBB-TE network and the second network 620 is a G.8032 sub-ring. The PBB-TE network 610 comprises a network element 612. The network element 612 may be a computer, a server, a node, a router, a switch, a bridge, a hub, a proxy, and/or another network device configured to pass data to another network element. The G.8032 sub-ring 620 comprises network elements 621, 622, 623, 624, 625, and 626. The network elements 621, 622, 623, 624, 625, and 626 may be computers, servers, nodes, routers, switches, bridges, hubs, proxies, and/or other network devices configured to pass data to one another. In FIG. 6, the solid line between network elements 621 and 612 indicates the primary data path, while the dashed line between network elements 622 and 612 indicates a backup data path.

Network elements 623, 624, 625, and 626 are configured with the G.8032 protocol (a sub-ring tandem). The network elements 621 and 622 are not configured as a G.8032 node, but are configured to discard reception of R-APS PDUs. The network elements 621 and 622 can terminate the PBB-TE tunnel (working and/or protected). A CCM session can optionally be configured between network elements 621 and 626, and network elements 622 and 623. The virtual switch (VS) at network elements 621 and 622 provide data forwarding connectivity between network elements 621 and 622. A Link Aggregation Group (LAG) is recommended for resiliency.

Referring to the example illustrated in FIG. 6, an entry in the event-action profiles stored at network element 621 might include the entries illustrated in Table 4.

TABLE 4

Device 621/622 Event-Action Profile

| Entry | Event | Interface | Action | Interface |
|---|---|---|---|---|
| 1 | G.8032 R-APS Status Change | | Flush FDB | <621-626, 621-622> |
| 2 | PBB-TE Tunnel State Change | | Flush FDB | <621-626, 621-622> |

The Interface value "<721-726, 721-722>" indicates the interfaces between network elements 721 and 726 and 721 and 722.

Figure 7:
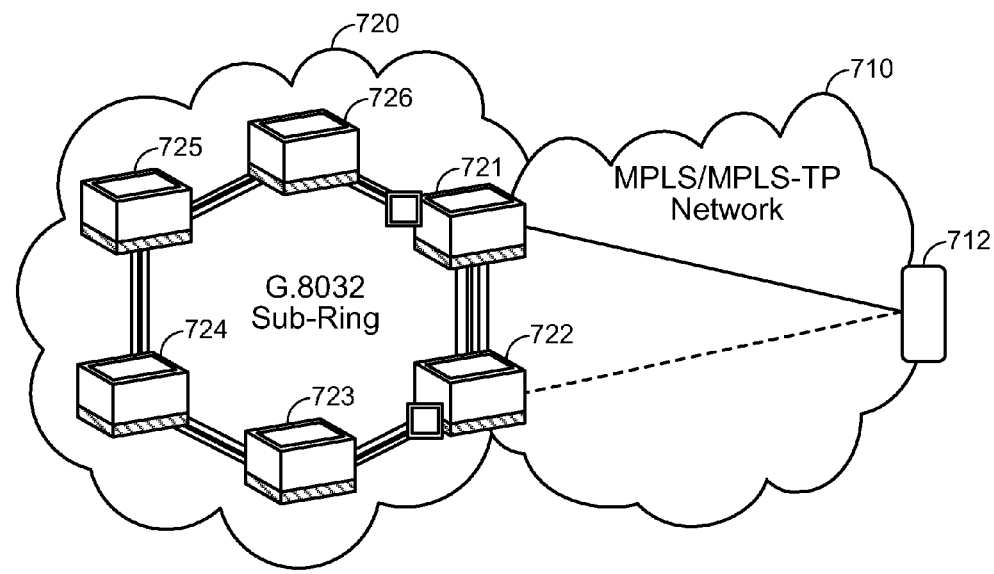
FIG. 7 illustrates a high-level system architecture of an exemplary communications system in which a first network and a second network are interconnected.

FIG. 7 illustrates a high-level system architecture of an exemplary communications system in which a first network 710 and a second network 720 are interconnected. In the example of FIG. 7, the first network 710 is a MPLS/MPLS-TP network and the second network 720 is a G.8032 sub-ring. The MPLS/MPLS-TP network 710 comprises a network element 712. The network element 712 may be a computer, a server, a node, a router, a switch, a bridge, a hub, a proxy, and/or another network device configured to pass data to another network element. The G.8032 sub-ring 720 comprises network elements 721, 722, 723, 724, 725, and 726. The network elements 721, 722, 723, 724, 725, and 726 may be computers, servers, nodes, routers, switches, bridges, hubs, proxies, and/or other network devices configured to pass data to one another. In FIG. 7, the solid line between network elements 721 and 712 indicates the primary data path, while the dashed line between network elements 722 and 712 indicates a backup data path.

Network elements 723, 724, 725, and 726 are configured with the G.8032 protocol (a sub-ring tandem). The network elements 721 and 722 are not configured as a G.8032 node, but are configured to discard reception of R-APS PDUs. The network elements 721 and 722 can terminate the MPLS/MPLS-TP Label Switch Paths (LSPs) (working and/or protected). A CCM session can optionally be configured between network elements 721 and 726, and network elements 722 and 723. VS at network elements 721 and 722 provide data forwarding connectivity between network elements 721 and 722. LAG is recommended for resiliency.

Referring to the example illustrated in FIG. 7, an entry in the event-action profiles stored at network elements 721 and/or 722 might include the entries illustrated in Table 5.

TABLE 5

Device 721/722 Event-Action Profile

| Entry | Event | Interface | Action | Interface |
|---|---|---|---|---|
| 1 | G.8032 R-APS Status Change | <721-726> | Flush FDB | <721-722> |
| 2 | MPLS/MPLS-TP LSP State Change | <722-723> | Flush FDB | <721-722> |

The Interface value "<721-726>" indicates the interface between network elements 721 and 726. The Interface value "<721-722>" indicates the interfaces between network elements 721 and 722. The Interface value "<722-723>" indicates the interface between network elements 722 and 723.

Figure 8:
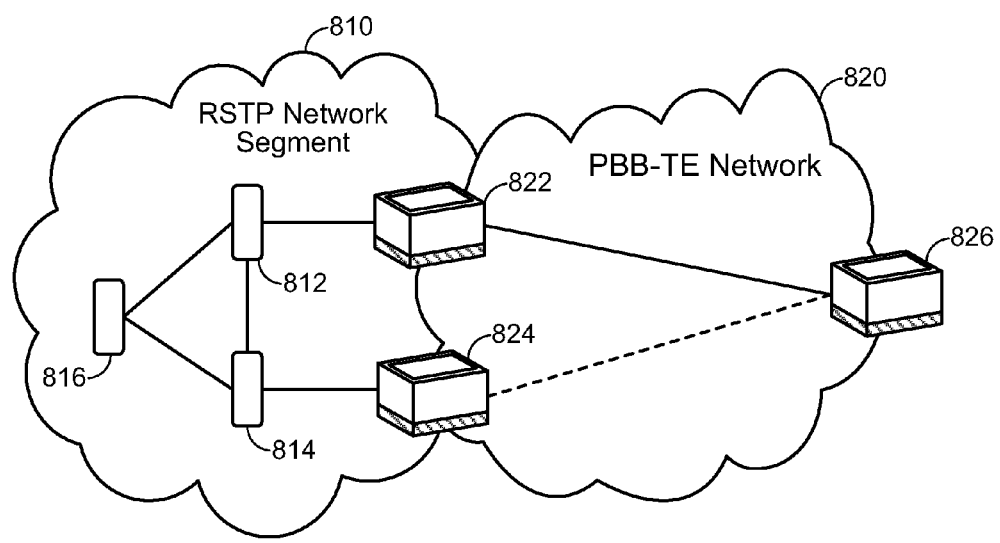
FIG. 8 illustrates a high-level system architecture of an exemplary communications system in which a first network and a second network are interconnected.

FIG. 8 illustrates a high-level system architecture of an exemplary communications system in which a first network 810 and a second network 820 are interconnected. In the example of FIG. 8, the first network 810 is an RSTP network segment and the second network 820 is a PBB-TE network. The RSTP network segment 810 comprises network elements 812, 814, and 816. The network elements 812, 814, and 816 may be computers, servers, nodes, routers, switches, bridges, hubs, proxies, and/or other network devices configured to pass data to one another. The PBB-TE network 820 comprises network elements 822, 824, and 826. The network elements 822, 824, and 826 may be computers, servers, nodes, routers, switches, bridges, hubs, proxies, and/or other network devices configured to pass data to one another. In FIG. 8, the solid line between network elements 822 and 826 indicates the primary data path, while the dashed line between network elements 824 and 826 indicates a backup data path. Network elements 822 and 824 terminate the PBB-TE tunnel (working and/or protected) and do not participate in xSTP.

Referring to the example illustrated in FIG. 8, entries in the event-action profiles stored at network elements 822 and/or 824 might include the entries illustrated in Table 6.

TABLE 6

Device 822/824 Event-Action Profile

| Entry | Event | Interface | Action | Interface |
|---|---|---|---|---|
| 1 | EVC Fault | <822-826>/<824-826> | Port Down | <812-822>/<814-824> |
| 2 | EVC Recovery | <822-826>/<824-826> | Port Up | <812-822>/<814-824> |
| 3 | Port Down | <812-822>/<814-824> | EVC Down | <822-826>/<824-826> |
| 4 | Port Up | <812-822>/<814-824> | EVC Up | <822-826>/<824-826> |

The Interface value "<822-826>" indicates the interface between network elements 822 and 826. The Interface value "<824-826>" indicates the interfaces between network elements 824 and 826. The Interface value "<812-822>" indicates the interface between network elements 812 and 822. The Interface value "<814-824>"indicates the interface between network elements 814 and 824.

Figure 9:
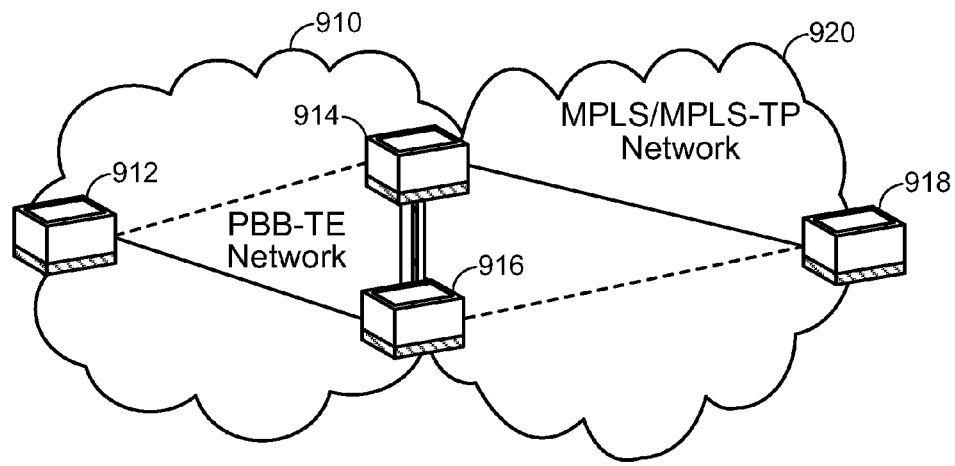
FIG. 9 illustrates a high-level system architecture of an exemplary communications system in which a first network and a second network are interconnected.

FIG. 9 illustrates a high-level system architecture of an exemplary wireless communications system in which a first network 910 and a second network 920 are interconnected. In the example of FIG. 9, the first network 910 is a PBB-TE network and the second network 920 is an MPLS/MPLS-TP network. The PBB-TE network 910 comprises network elements 912, 914, and 916. The MPLS/MPLS-TP network 920 comprises network element 918. The network elements 912, 914, 916, and 918 may be computers, servers, nodes, routers, switches, bridges, hubs, proxies, and/or other network devices configured to pass data to one another. In FIG. 9, the solid lines between network elements 912 and 916 and 914 and 918 indicate the primary data paths, while the dashed lines between network elements 912 and 914 and 916 and 918 indicate a backup data path.

Network elements 914 and 916 terminate MPLS/MPLS-TP LSPs (working and/or protected) and terminate PBB-TE tunnels (working and/or protected). A Virtual Forwarding Instance (VFI) at network elements 914 and 916 provides data forwarding connectivity between network elements 914 and 916. LAG is recommended for resiliency.

Referring to the example illustrated in FIG. 9, entries in the event-action profiles stored at network elements 914 and/or 916 might include the entries illustrated in Table 7.

TABLE 7

Device 914/916 Event-Action Profile

| Entry | Event | Interface | Action | Interface |
|---|---|---|---|---|
| 1 | PBB-TE Tunnel State Change | <912-914>/<912-916> | Flush FDB | <914-916> |
| 2 | MPLS/MPLS-TP LSP State Change | <914-918>/<916-918> | Flush FDB | <914-916> |

The Interface value "<912-914>" indicates the interface between network elements 912 and 914, the Interface value "<914-918>" indicates the interfaces between network elements 914 and 918, the Interface value "<914-816>" indicates the interface between network elements 914 and 916, and so on.

Figure 10:
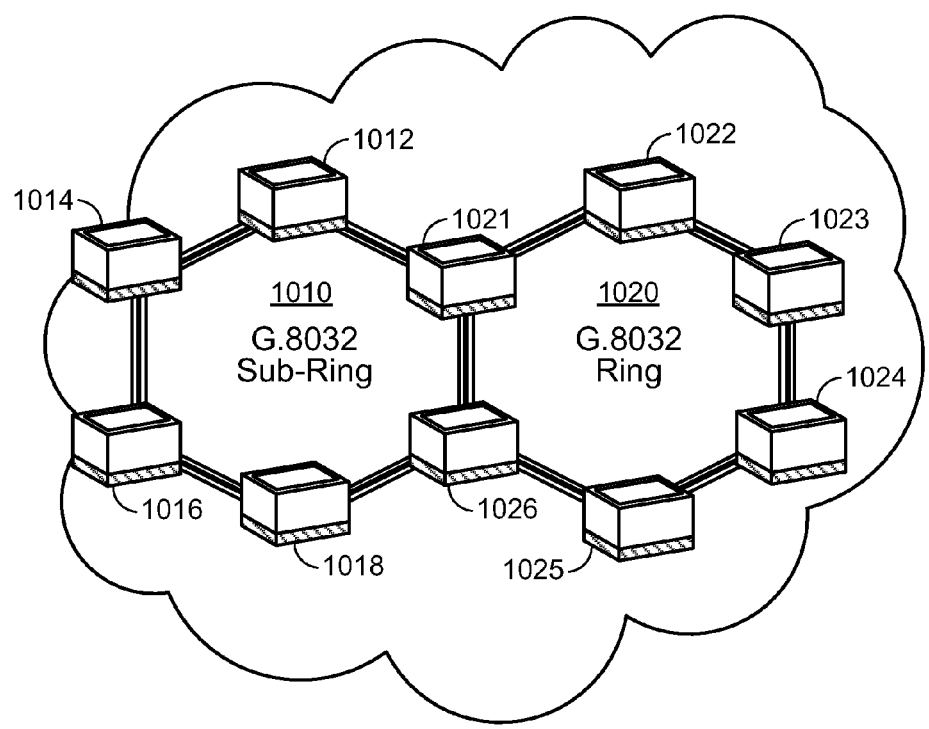
FIG. 10 illustrates a high-level system architecture of an exemplary communications system in which a first network and a second network are interconnected.

The various aspects of the disclosure are also applicable to interconnections between the same types of networks. FIG. 10 illustrates a high-level system architecture of an exemplary communications system in which a first network 1010 and a second network 1020 are interconnected. In the example of FIG. 10, the first network 1010 is a G.8032 sub-ring and the second network 1020 is a G.8032 ring. The G.8032 sub-ring 1010 comprises network elements 1012, 114, 1016, and 1018. The G.8032 ring 1020 comprises network elements 1021, 1022, 1023, 1024, 1025, and 1026. The network elements 1012, 1014, 1016, 1018, 1021, 1022, 1023, 1024, 1025, and 1026 may be computers, servers, nodes, routers, switches, bridges, hubs, proxies, and/or other network devices configured to pass data to one another.

Referring to the example illustrated in FIG. 10, entries in the event-action profile stored at network element 1021 might include the entries illustrated in Table 8.

TABLE 8

Device 914/916 Event-Action Profile

| Entry | Event | Interface | Action | Interface |
|---|---|---|---|---|
| 1 | G.8032 R-APS Status Change | <1021-1012> | G.8032 Flush Event | G.8032 VR <ID> |

The Interface value "<1021-1012>" indicates the interface between network elements 1021 and 1012. Note, a G.8032 Flush Event is a standardized R-APS PDU that causes all ring nodes to flush their FDB.

Figure 11:
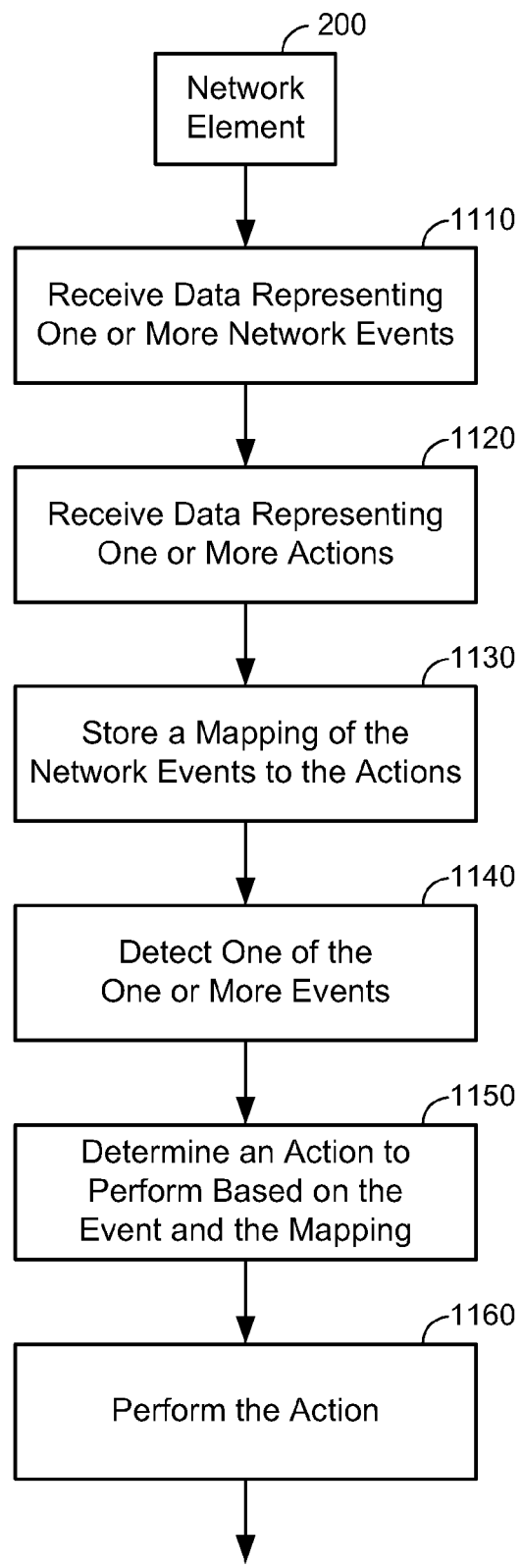
FIG. 11 illustrates an exemplary flow for configuring an internetworking of a first network and a second network according to an aspect of the disclosure.

FIG. 11 illustrates an exemplary flow for configuring an internetworking of a first network and a second network according to an aspect of the disclosure. At 1110, a network element, such as network element 200, receives data representing one or more network events. The data may be received from a user via a user interface, from a third-party server, from a network controller, or the like. At 1120, the network element 200 receives data representing one or more actions to be performed by the second network in response to detection of the one or more events on the first network. Again, the data may be received from a user via a user interface, from a third-party server, from a network controller, or the like. At 1130, the network element 200 stores a mapping of the one or more network events to the one or more actions.

At 1140, the network element 200 detects one of the one or more events on the first network. At 1150, the network element 200 determines a corresponding action to perform on the second network based on the detected event and the mapping. At 1160, the network element 200 performs the corresponding action on the second network.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of configuring an internetworking of a first network and a second network, comprising: receiving, at a network element, data representing one or more network events in the first network in a first packet network protocol associated with the first network; receiving, at the network element, data representing one or more actions to be performed by the second network in response to detection of the one or more events in the first network in a second packet network protocol associated with the second network, wherein the first packet network protocol is different from the second packet network protocol; and storing, by the network element, a mapping of the one or more network events in the first network to the one or more actions in the second network to achieve the internetworking of packet network protocols of the first network and the second network, wherein the internetworking comprises a combination of OAM (Operations, Administration, and Management) plane internetworking and control plane internetworking, and wherein the first packet network protocol and the second packet network protocol each comprise one of a Spanning Tree Protocol, Rapid Spanning Tree Protocol, Provider Backbone Bridge Traffic Engineering, Multiprotocol Label Switching/Multiprotocol Label Switching Transport Profile, and G.8032.

2. The method of claim 1, further comprising: detecting one of the one or more events on the first network; determining a corresponding action to perform on the second network based on the detected event and the mapping; and performing the corresponding action on the second network.

3. The method of claim 1, wherein the first network and the second network implement different types of network protocols.

4. The method of claim 1, wherein the first network and the second network implement a same type of network protocol.

5. The method of claim 1, wherein the first network is a packet network.

6. The method of claim 1, wherein the second network is a packet network.

7. The method of claim 1, wherein the one or more actions are actions that translate the one or more events into corresponding events on the second network.

8. The method of claim 1, wherein the data representing the one or more events is received from a user, a remote server, or a network controller.

9. The method of claim 1, wherein the data representing the one or more actions is received from a user, a remote server, or a network controller.

10. The method of claim 1, wherein the data representing the one or more events is received from a user via a user interface of the network element.

11. The method of claim 1, wherein the data representing the one or more actions is received from a user via a user interface of the network element.

12. The method of claim 1, wherein the mapping is generated by a user indicating which of the one or more actions maps to the one or more network events.

13. The method of claim 1, wherein the mapping is a table comprising the one or more network events, one or more interfaces associated with the one or more network events, the one or more actions, and one or more interfaces associated with the one or more actions.

14. The method of claim 1, wherein the network element is a desktop computer, a server, a node, a router, a switch, a bridge, a hub, a proxy, or other network device coupled to and configured to pass data to another network element.

15. The method of claim 5, wherein the packet network is a Spanning Tree Protocol (STP) network, a Provider Backbone Bridge Traffic Engineering (PBB-TE) network, a Multiprotocol Label Switching/Multiprotocol Label Switching Transport Profile (MPLS/MPLS-TP) network, or a G.8032 network.

16. The method of claim 6, wherein the packet network is a Spanning Tree Protocol (STP) network, a Provider Backbone Bridge Traffic Engineering (PBB-TE) network, a Multiprotocol Label Switching/Multiprotocol Label Switching Transport Profile (MPLS/MPLS-TP) network, or a G.8032 network.

17. The method of claim 13, wherein the one or more interfaces associated with the one or more network events are one or more interfaces between the network element and a network element on the second network.

18. The method of claim 13, wherein the one or more interfaces associated with the one or more actions are one or more interfaces between the network element and a network element on the second network.

19. An apparatus for configuring an internetworking of a first network and a second network, comprising: logic configured to receive, at a network element, data representing one or more network events in the first network in a first packet network protocol associated with the first network; logic configured to receive, at the network element, data representing one or more actions to be performed by the second network in response to detection of the one or more events in the first network in a second packet network protocol associated with the second network, wherein the first packet network protocol is different from the second packet network protocol; and logic configured to store, by the network element, a mapping of the one or more network events in the first network to the one or more actions in the second network to achieve the internetworking of packet network protocols of the first network and the second network, wherein each of the logics comprises one of hardware and a combination of hardware and software, wherein the internetworking comprises a combination of OAM (Operations, Administration, and Management) plane internetworking and control plane internetworking, and wherein the first packet network protocol and the second packet network protocol each comprise one of a Spanning Tree Protocol, Rapid Spanning Tree Protocol, Provider Backbone Bridge Traffic Engineering, Multiprotocol Label Switching/Multiprotocol Label Switching Transport Profile, and G.8032.

20. The apparatus of claim 19, further comprising: logic configured to detect one of the one or more events on the first network; logic configured to determine a corresponding action to perform on the second network based on the detected event and the mapping; and logic configured to perform the corresponding action on the second network.

21. The apparatus of claim 19, wherein the first network and the second network implement different types of network protocols.

22. The apparatus of claim 19, wherein the first network and the second network implement a same type of network protocol.

23. The apparatus of claim 19, wherein the one or more actions are actions that translate the one or more events into corresponding events on the second network.

24. The apparatus of claim 19, wherein the data representing the one or more events is received from a user via a user interface of the network element.

25. The apparatus of claim 19, wherein the data representing the one or more actions is received from a user via a user interface of the network element.

26. The apparatus of claim 19, wherein the mapping is generated by a user indicating which of the one or more actions maps to the one or more network events.

27. A network element configured to interwork a first network and a second network, comprising: a communications interface configured to receive data representing one or more network events in the first network in a first packet network protocol associated with the first network; the communications interface configured to receive data representing one or more actions to be performed by the second network in response to detection of the one or more events in the first network in a second packet network protocol associated with the second network, wherein the first packet network protocol is different from the second packet network protocol; and memory for storing a mapping of the one or more network events in the first network to the one or more actions in the second network to interwork packet network protocols of the first network and the second network, wherein the packet network protocols interwork through a combination of OAM (Operations, Administration, and Management) plane internetworking and control plane internetworking, and wherein the first packet network protocol and the second packet network protocol each comprise one of a Spanning Tree Protocol, Rapid Spanning Tree Protocol, Provider Backbone Bridge Traffic Engineering, Multiprotocol Label Switching/Multiprotocol Label Switching Transport Profile, and G.8032.

28. The network element of claim 27, further comprising: a logic circuit configured one of the one or more events on the first network; the logic circuit configured to determine a corresponding action to perform on the second network based on the detected event and the mapping; and the logic circuit configured to perform the corresponding action on the second network.

29. The network element of claim 27, wherein the first network and the second network implement different types of network protocols.

30. The network element of claim 27, wherein the first network and the second network implement a same type of network protocol.

31. The network element of claim 27, wherein the one or more actions are actions that translate the one or more events into corresponding events on the second network.

32. The network element of claim 27, wherein the data representing the one or more events is received from a user via a user interface of the network element.

33. The network element of claim 27, wherein the data representing the one or more actions is received from a user via a user interface of the network element.

34. The network element of claim 27, wherein the mapping is generated by a user indicating which of the one or more actions maps to the one or more network events.

35. A non-transitory computer-readable medium for configuring an internetworking of a first network and a second network, comprising: at least one instruction to receive, at a network element, data representing one or more network events in the first network in a first packet network protocol associated with the first network; at least one instruction to receive, at the network element, data representing one or more actions to be performed by the second network in response to detection of the one or more events in the first network in a second packet network protocol associated with the second network, wherein the first packet network protocol is different from the second packet network protocol; and at least one instruction to store, by the network element, a mapping of the one or more network events in the first network to the one or more actions in the second network to achieve the internetworking of packet network protocols of the first network and the second network, wherein the internetworking comprises a combination of OAM (Operations, Administration, and Management) plane internetworking and control plane internetworking, and wherein the first packet network protocol and the second packet network protocol each comprise one of a Spanning Tree Protocol, Rapid Spanning Tree Protocol, Provider Backbone Bridge Traffic Engineering, Multiprotocol Label Switching/Multiprotocol Label Switching Transport Profile, and G.8032.

36. The non-transitory computer-readable medium of claim 35, further comprising: at least one instruction to detect one of the one or more events on the first network; at least one instruction to determine a corresponding action to perform on the second network based on the detected event and the mapping; and at least one instruction to perform the corresponding action on the second network.

37. The non-transitory computer-readable medium of claim 35, wherein the first network and the second network implement different types of network protocols.

38. The non-transitory computer-readable medium of claim 35, wherein the first network and the second network implement a same type of network protocol.

39. The non-transitory computer-readable medium of claim 35, wherein the one or more actions are actions that translate the one or more events into corresponding events on the second network.

40. The non-transitory computer-readable medium of claim 35, wherein the data representing the one or more events is received from a user via a user interface of the network element.

41. The non-transitory computer-readable medium of claim 35, wherein the data representing the one or more actions is received from a user via a user interface of the network element.

42. The non-transitory computer-readable medium of claim 35, wherein the mapping is generated by a user indicating which of the one or more actions maps to the one or more network events.

* * * * *